(12) United States Patent
Shachar et al.

(10) Patent No.: US 12,287,875 B2
(45) Date of Patent: Apr. 29, 2025

(54) DEVICE PROTECTION AGAINST UNAUTHORIZED ENCRYPTION USING POPULATION OF AVAILABLE STORAGE

(71) Applicant: Dell Products L.P., Round Rock, TX (US)

(72) Inventors: Tomer Shachar, Beer Sheva (IL); Yevgeni Gehtman, Modi'in (IL); Ophir Buchman, Raanana (IL)

(73) Assignee: Dell Products L.P., Round Rock, TX (US)

( * ) Notice: Subject to any disclaimer, the term of this patent is extended or adjusted under 35 U.S.C. 154(b) by 180 days.

(21) Appl. No.: 18/109,584

(22) Filed: Feb. 14, 2023

(65) Prior Publication Data

US 2024/0273190 A1   Aug. 15, 2024

(51) Int. Cl.
*G06F 21/55* (2013.01)
*G06F 21/56* (2013.01)

(52) U.S. Cl.
CPC .......... *G06F 21/554* (2013.01); *G06F 21/566* (2013.01); *G06F 2221/034* (2013.01)

(58) Field of Classification Search
CPC . G06F 21/554; G06F 21/566; G06F 2221/034
See application file for complete search history.

(56) References Cited

U.S. PATENT DOCUMENTS

| | | | | |
|---|---|---|---|---|
| 7,444,561 B2 * | 10/2008 | Korkishko | ............... | G06F 11/08 714/736 |
| 9,348,819 B1 * | 5/2016 | Emelyanov | ......... | G06F 16/2308 |
| 10,019,279 B2 * | 7/2018 | Bacher | .................. | G06F 3/0622 |
| 10,387,648 B2 * | 8/2019 | Hirschberg | ........... | G06F 21/566 |

(Continued)

FOREIGN PATENT DOCUMENTS

| | | | | |
|---|---|---|---|---|
| WO | WO-2007099224 A2 * | 9/2007 | ........... | G06F 21/577 |
| WO | WO-2024165152 A1 * | 8/2024 | ............. | G06F 21/56 |

OTHER PUBLICATIONS

"Ransomware Epidemic: Use these 8 Strategies to Mitigate Risk"; AON; https://www.aon.com/insights/articles/2022/ransomware-epidemic-8-strategies-to-mitigate-risk#:~:text=Design%20your%20networks%2C%20systems%2C%20and,the%20event%20of%20incident%20response; Aug. 2022.

(Continued)

*Primary Examiner* — Christopher A Revak
(74) *Attorney, Agent, or Firm* — Ryan, Mason & Lewis, LLP

(57) ABSTRACT

Techniques are provided for device protection against unauthorized encryption using population of available storage. One method comprises obtaining, in response to an unauthorized encryption of data associated with a processing device, an indication of an amount of available storage space in a storage device associated with the processing device; creating a file to populate the indicated amount of available storage space in the storage device; and writing the created file to the storage device. The unauthorized encryption of data may comprise a ransomware attack. The indicated amount of available storage space in the storage device may comprise an amount of available space in a file system associated with the storage device. The file system may write the created file to the storage device by populating available storage areas of the storage device.

20 Claims, 8 Drawing Sheets

(56) References Cited

U.S. PATENT DOCUMENTS

| | | | | |
|---|---|---|---|---|
| 10,685,116 | B2* | 6/2020 | Satpathy | G06F 21/566 |
| 11,509,682 | B1* | 11/2022 | Paget | H04L 63/1433 |
| 2008/0313473 | A1* | 12/2008 | Provencher | G06F 21/554 |
| | | | | 713/193 |
| 2014/0109216 | A1* | 4/2014 | Iversen | G06F 21/31 |
| | | | | 726/17 |
| 2018/0107824 | A1* | 4/2018 | Gibbons, Jr. | G06F 21/565 |
| 2019/0278922 | A1* | 9/2019 | Levin | G06F 21/604 |
| 2021/0150025 | A1* | 5/2021 | Ben-Shalom | G06F 21/554 |
| 2021/0271757 | A1* | 9/2021 | Horspool | G06F 21/554 |
| 2022/0318403 | A1* | 10/2022 | Vágujhelyi | H04L 9/0866 |
| 2023/0259625 | A1* | 8/2023 | Gechman | G06F 21/566 |
| | | | | 726/23 |
| 2024/0320335 | A1* | 9/2024 | Ezrielev | G06F 21/554 |

OTHER PUBLICATIONS

"Mitigating Malware and Ransomware Attacks"; https://www.ncsc.gov.uk/guidance/mitigating-malware-and-ransomware-attacks; Feb. 13, 2020.

Carson, Joseph; "Ransomware Mitigation: Where do we go from here"; Delinea Blog; https://delinea.com/blog/ransomware-mitigation; downloaded on Feb. 13, 2023.

\* cited by examiner

DEVICE PROTECTION AGAINST UNAUTHORIZED ENCRYPTION USING POPULATION OF AVAILABLE STORAGE

FIELD

The field relates generally to information processing systems, and more particularly to the protection of devices in such information processing systems.

BACKGROUND

Computing devices are typically configured to incorporate security functionality to protect such devices from malicious activity. For example, it may be desirable to prevent suspicious computer operations unless they are implemented by a legitimate and authorized user. Role-based access control (RBAC) techniques may be employed to restrict access to devices or network resources based on the roles of individual users within an organization. RBAC techniques typically allow users to access only the information and other resources needed for their jobs and prevent users from accessing additional resources. RBAC techniques, however, are vulnerable to various types of attacks. For example, ransomware and other types of malware techniques can be employed to encrypt data and prevent access to the encrypted data until a ransom is paid.

A need exists for improved techniques for protecting devices from suspicious and/or unauthorized computer operations.

SUMMARY

In one embodiment, a method comprises obtaining, in response to a detection of an unauthorized encryption of data associated with at least one processing device, an indication of an amount of available storage space in at least one storage device associated with the at least one processing device; creating one or more files to populate the indicated amount of available storage space in the at least one storage device; and writing the created one or more files to the at least one storage device.

In some embodiments, the obtaining the indication of the amount of available storage space comprises querying an operating system associated with the at least one processing device. An out-of-space error may be generated in response to a further write operation, following the writing of the created one or more files to the at least one storage device. The unauthorized encryption of data may comprise a ransomware attack.

In one or more embodiments, the indicated amount of available storage space in the at least one storage device comprises one or more of sequential and non-sequential storage areas of the at least one storage device. The indicated amount of available storage space in the at least one storage device may comprise an amount of available space in a file system associated with the at least one storage device. The file system of the at least one processing device may write the created one or more files to the at least one storage device by populating available storage areas of the at least one storage device.

Other illustrative embodiments include, without limitation, apparatus, systems, methods and computer program products comprising processor-readable storage media.

DETAILED DESCRIPTION

Figure 1:
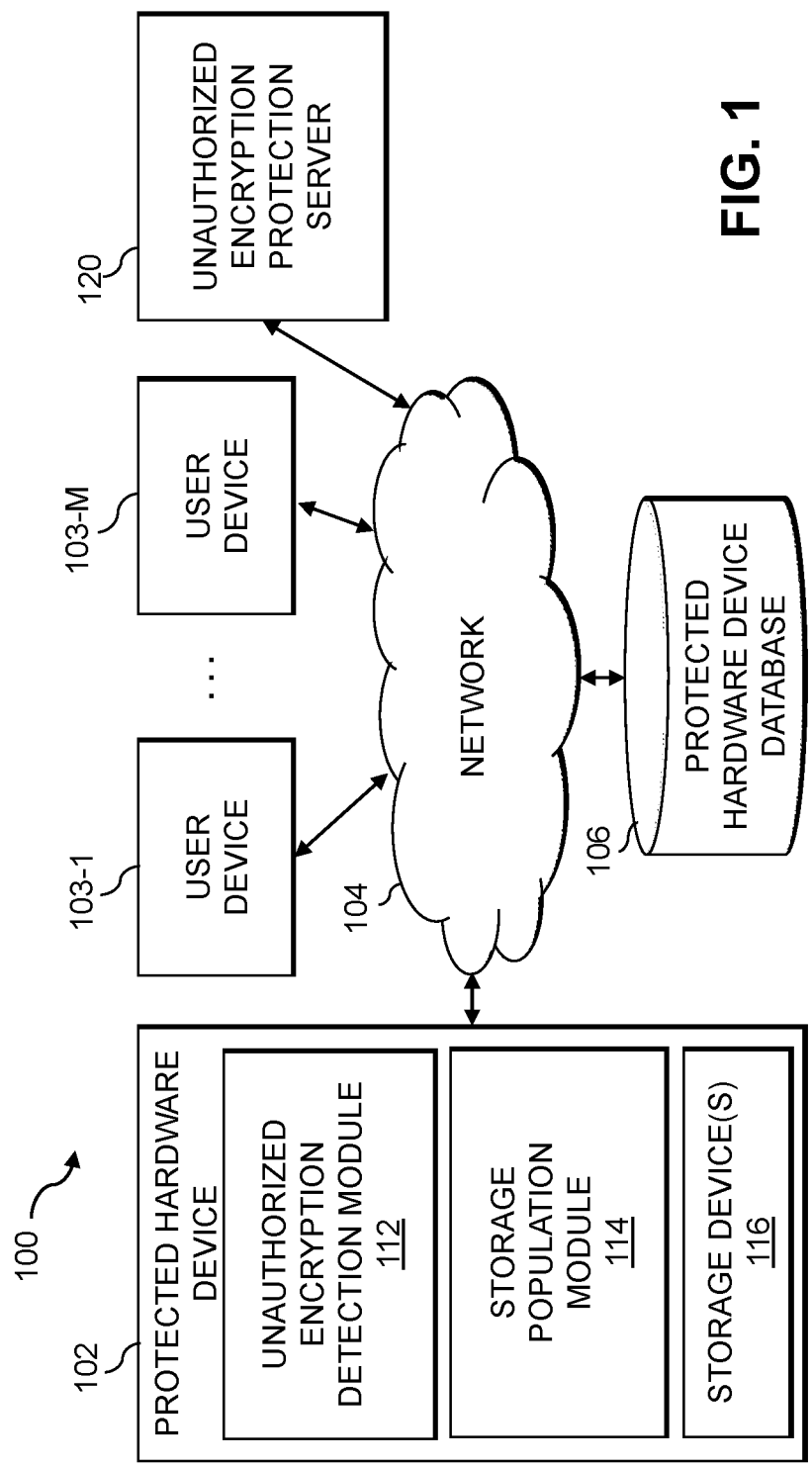
FIG. 1 illustrates an information processing system configured for device protection against unauthorized encryption using population of available storage in accordance with an illustrative embodiment.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for device protection against unauthorized encryption using population of available storage.

In a typical ransomware attack, the attacker may establish persistent control on a given device, for example, with high privilege user credentials. The attacker may then access and encrypt the files on the given device. In many ransomware attacks, the attacker encrypts the files in place (e.g., read a file from a storage device, encrypt the file in-memory, write the new encrypted file to the storage device and then delete the original unencrypted file). One or more aspects of the disclosure recognize that it is often difficult to stop a ransomware attack once it has begun. Files that have been encrypted typically cannot be decrypted until a specified ransom is paid. Therefore, once a ransomware attack is detected, the ability to mitigate against further damage is needed.

Illustrative embodiments disclosed herein protect against ransomware and other types of malware attacks that attempt to encrypt data without authorization. In one or more embodiments, unauthorized encryption device protection techniques are provided to detect and mitigate against unauthorized encryption. Unauthorized encryption may occur accidentally or due to, for example, third party attacks (such as ransomware and/or other malware attacks).

In some embodiments, further damage from a detected unauthorized encryption of data on a protected device is mitigated by preventing the ransomware from writing the new encrypted files to a storage device associated with the protected device. Once an ongoing ransomware attack (or another unauthorized encryption process) is detected in a protected device, the disclosed unauthorized encryption protection techniques create a file (sometimes referred to herein as a balloon file) to populate the remaining available storage space in a storage device associated with the protected device.

In one or more embodiments, the amount of available storage space in storage devices associated with the protected device may be obtained from a file system of the protected device. In addition, the file system of the protected device is responsible, in at least some embodiments, for writing the created file to the storage devices associated with the protected device.

In this manner, the remaining available storage space is populated by the created file and is no longer available for the attacker to write the new encrypted files to the storage device. Thus, the attacker may no longer continue the cycle of encrypting files in place (e.g., read a file from a storage device, encrypt the file in-memory, write the new encrypted file to the storage device and then delete the original unencrypted file).

Among other benefits, the disclosed unauthorized encryption protection techniques protect devices and the data associated with such devices from unauthorized encryption of data. For example, an unauthorized encryption may be detected and appropriate mitigation measures may be initiated using the disclosed unauthorized encryption protection techniques.

FIG. 1 shows a computer network (also referred to herein as an information processing system) 100 configured in accordance with an illustrative embodiment. The computer network 100 comprises a plurality of user devices 103-1 through 103-M, collectively referred to herein as user devices 103. The user devices 103 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is one or more protected hardware devices 102, one or more unauthorized encryption protection servers 120 and one or more protected hardware device databases 106, discussed below.

The protected hardware devices 102 may comprise edge devices, host devices and other devices that execute user commands. One or more aspects of the disclosure recognize that edge devices, for example, are attractive targets for an attack and often comprise critical infrastructure that may require an evaluation of whether to execute certain commands and/or operations and/or whether the contents of storage devices have been encrypted without authorization. Edge devices may be stored, for example, in a physical location that may not be properly secured. An attacker may be able to access a perimeter of a location of the edge device (or another adjacent or nearby location that is within range of the edge device).

The user devices 103 may comprise, for example, host devices and/or devices such as mobile telephones, laptop computers, tablet computers, desktop computers or other types of computing devices. Such devices are examples of what are more generally referred to herein as "processing devices" which may be protected using the disclosed device protection techniques. Some of these processing devices are also generally referred to herein as "computers." The user devices 103 may comprise a network client that includes networking capabilities such as ethernet, Wi-Fi, etc. When the user devices 103 are implemented as host devices, the host devices may illustratively comprise servers or other types of computers of an enterprise computer system, cloud-based computer system or other arrangement of multiple compute nodes associated with respective users.

For example, the host devices in some embodiments illustratively provide compute services such as execution of one or more applications on behalf of each of one or more users associated with respective ones of the host devices.

The user devices 103 in some embodiments comprise respective processing devices associated with a particular company, organization or other enterprise or group of users. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

It is to be appreciated that the term "user" in this context and elsewhere herein is intended to be broadly construed so as to encompass, for example, human, hardware, software or firmware entities (including services), as well as various combinations of such entities. Compute and/or storage services may be provided for users under a Platform-as-a-Service (PaaS) model, a Storage-as-a-Service (STaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

As shown in FIG. 1, an exemplary protected hardware device 102 may comprise an unauthorized encryption detection module 112, a storage population module 114 and one or more storage devices 116 (e.g., one or more solid-state drives (SSDs) and/or one or more hard disk drives (HDDs)). In some embodiments, the unauthorized encryption detection module 112 automatically detects an unauthorized encryption, as discussed further below in conjunction with FIGS. 3 through 5. The storage population module 114 may request a user approval of a detected change in the contents of the protected storage region and can copy the contents of the backup storage region to the protected storage region when the user does not approve the detected change. In some embodiments, any changes to data stored in the protected storage region require a designated level of approval.

It is to be appreciated that this particular arrangement of elements 112, 114, 116 illustrated in the protected hardware device 102 of the FIG. 1 embodiment is presented by way of example only, and alternative arrangements can be used in other embodiments. For example, the functionality associated with elements 112, 114, 116 in other embodiments can be combined into a single element, or separated across a larger number of elements. As another example, multiple distinct processors can be used to implement different ones of elements 112, 114 and 116, or portions thereof.

At least portions of elements 112, 114, 116 may be implemented at least in part in the form of software that is stored in memory and executed by a processor. An exemplary process utilizing elements 112, 114, 116 of the protected hardware device 102 in computer network 100 will be described in more detail with reference to FIGS. 4 through 6, for example.

Other protected hardware devices 102 (not shown in FIG. 1) are assumed to be configured in a manner similar to that shown for protected hardware device 102 in the figure.

The unauthorized encryption protection server 120 may be implemented, for example, on the cloud, such as a private cloud, or on the premises of an enterprise or another entity. In some embodiments, the unauthorized encryption protection server 120, or portions thereof, may be implemented as part of a host device. The unauthorized encryption protection server 120 may implement server-side functionality associated with the disclosed unauthorized encryption protection techniques, such as, for example, implementing policies for detecting unauthorized encryption or for designating one or more ransomware detection techniques, such as one or more commercially available virus detection processes, for detecting such an unauthorized encryption. Ransomware detection techniques typically identify unusual activity and automatically alert users. With the disclosed unauthorized encryption protection techniques, the detection of such an unauthorized encryption automatically triggers the disclosed mitigation feature of writing a file to populate the available storage space in one or more storage devices.

Additionally, the protected hardware device 102 and/or the unauthorized encryption protection server 120 can have an associated protected hardware device database 106 configured to store, for example, information related to various devices, such as one or more protected hardware devices 102, such as device locations, network address assignments and performance data. The protected hardware device database 106 may be maintained, for example, by the unauthorized encryption protection server 120 and accessible by one or more protected hardware devices 102.

The protected hardware device database 106 in the present embodiment is implemented using one or more storage systems associated with the unauthorized encryption protection server 120. Such storage systems can comprise any of a variety of different types of storage such as, network-attached storage (NAS), storage area networks (SANs), direct-attached storage (DAS) and distributed DAS, as well as combinations of these and other storage types, including software-defined storage.

The one or more protected hardware devices 102, user devices 103 and/or unauthorized encryption protection servers 120 may be implemented on a common processing platform, or on separate processing platforms. The one or more protected hardware devices 102 and user devices 103 may be configured to interact over the network 104 in at least some embodiments with the unauthorized encryption protection server 120.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the user devices 103 and the storage system to reside in different data centers. Numerous other distributed implementations of the host devices and the storage system are possible.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Also associated with the one or more protected hardware devices 102, user devices 103 and/or unauthorized encryption protection servers 120 can be one or more input-output devices (not shown), which illustratively comprise keyboards, displays or other types of input-output devices in any combination. Such input-output devices can be used, for example, to support one or more user interfaces to the unauthorized encryption protection server 120, as well as to support communication between the unauthorized encryption protection server 120 and other related systems and devices not explicitly shown.

The one or more protected hardware devices 102, user devices 103 and/or unauthorized encryption protection servers 120 in the FIG. 1 embodiment are assumed to be implemented using at least one processing device. Each such processing device generally comprises at least one processor and an associated memory and implements one or more functional modules for controlling certain features of the respective device.

More particularly, the one or more protected hardware devices 102, user devices 103 and/or unauthorized encryption protection servers 120 in this embodiment each can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including SSDs, and should therefore not be viewed as limited in any way to spinning magnetic media.

The network interface allows the one or more protected hardware devices 102, user devices 103 and/or unauthorized encryption protection servers 120 to communicate in some embodiments over the network 104 with each other (as well as one or more other networked devices, not shown), and illustratively comprises one or more conventional transceivers.

It is to be understood that the particular set of elements shown in FIG. 1 for device protection against unauthorized encryption using population of available storage is presented by way of illustrative example only, and in other embodiments additional or alternative elements may be used. Thus, another embodiment includes additional or alternative systems, devices and other network entities, as well as different arrangements of modules and other components.

Figure 2:
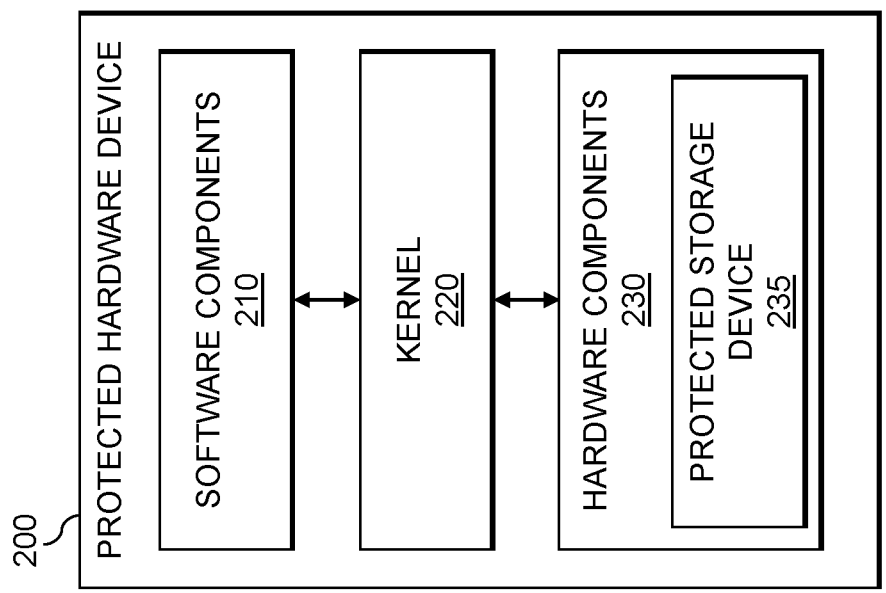
FIG. 2 illustrates the protected hardware device of FIG. 1 in further detail in accordance with an illustrative embodiment.

FIG. 2 illustrates a protected hardware device 200 in accordance with an illustrative embodiment. In the example of FIG. 2, the protected hardware device 200 comprises a kernel 220, resident in the memory of the protected hardware device 200, that provides an interface between software components 210 and hardware components 230. The hardware components 230 comprise one or more protected storage devices 235.

As used herein, the term "kernel" shall be broadly construed to encompass any computer program that is part of an operating system of a protected hardware device 200 that enables interactions between such software components 210, such as applications, and the hardware components 230 of the protected hardware device 200. The hardware components 230 may comprise, for example, processing components, memory components, storage components and other hardware components.

In one or more embodiments, the unauthorized encryption protection techniques described herein detect an unauthorized encryption and automatically trigger the disclosed mitigation feature of writing one or more files that populate the available storage space in the one or more protected storage devices 235 of the protected hardware device 200, thereby preventing any further unauthorized encryption of files.

Figure 3:
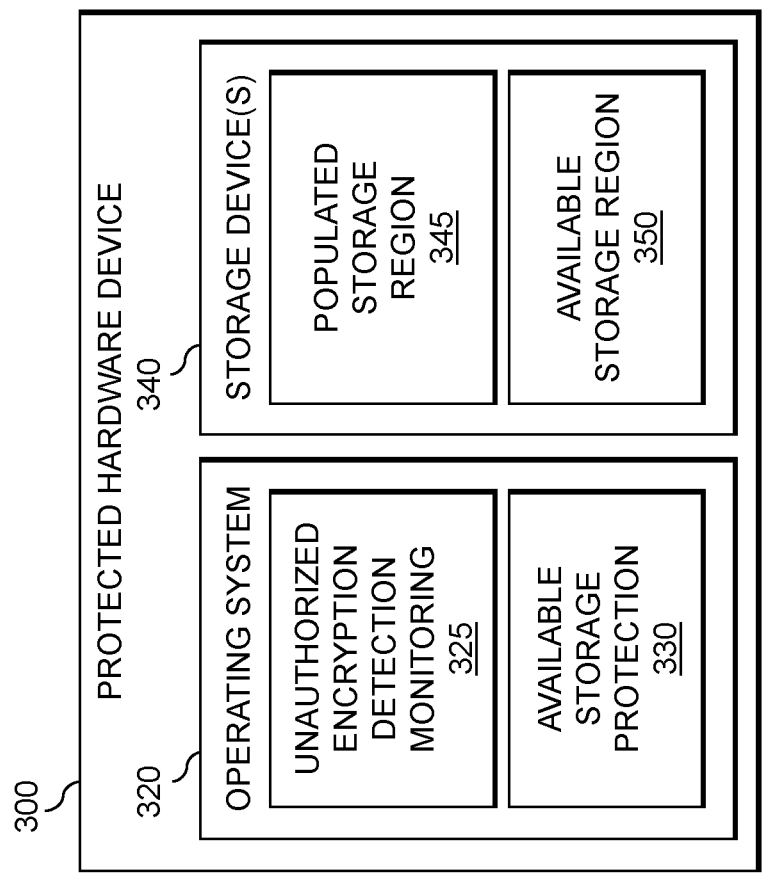
FIG. 3 illustrates a protected hardware device configured to provide unauthorized encryption protection in accordance with an illustrative embodiment.

FIG. 3 illustrates a protected hardware device 300 configured to provide unauthorized encryption protection in accordance with an illustrative embodiment. In the example of FIG. 3, the protected hardware device 300 comprises an operating system 320 (or a dedicated software agent) and one or more storage devices 340. In an agent-based implementation, the software agent may be installed, for example, on top of the operating system 320 of the protected hardware device 300. The operating system 320 (or dedicated software agent) performs the unauthorized encryption protection techniques described herein and comprises an unauthorized encryption detection monitoring function 325 and an available storage protection function 330.

The one or more storage devices 340 comprise a populated storage region 345 and an available storage region 350 representing an amount of available space in the respective storage devices 340.

In some embodiments, the unauthorized encryption detection monitoring function 325 implements ransomware detection techniques, such as commercially available virus detection software, for detecting an unauthorized encryption of data stored on the one or more storage devices 340. In response to a detected unauthorized encryption, the unauthorized encryption detection monitoring function 325 automatically triggers the available storage protection function 330 to write one or more files to the one or more storage devices 340 to populate the available storage space in the one or more storage devices 340.

The available storage protection function 330 may also notify one or more users of a detected unauthorized encryption.

Figure 4:
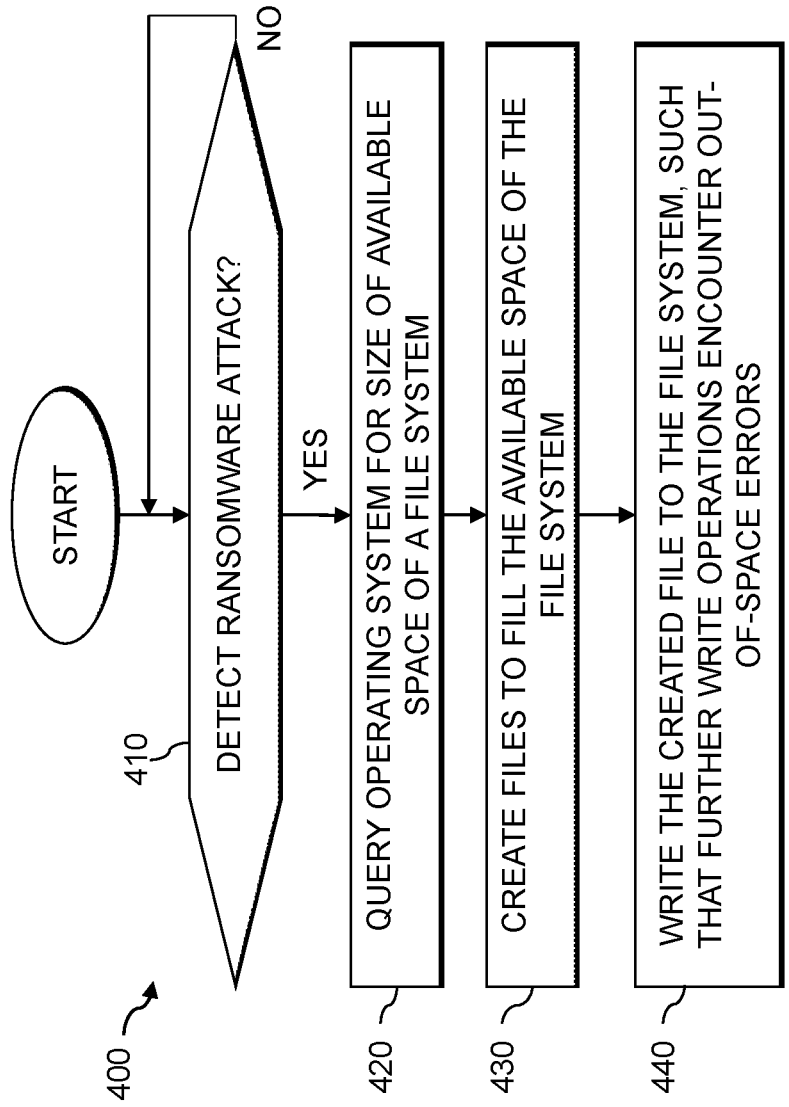
FIG. 4 is a flow chart illustrating an exemplary implementation of a process for device protection against unauthorized encryption using population of available storage in accordance with an illustrative embodiment.

FIG. 4 is a flow chart illustrating an exemplary implementation of a process 400 for device protection against unauthorized encryption using population of available storage in accordance with an illustrative embodiment. In some embodiments, the steps of the process 400 of FIG. 4 are performed by the unauthorized encryption detection monitoring function 325 and/or the available storage protection function 330 associated with the operating system 320 of FIG. 3, unless otherwise noted.

In the example of FIG. 4, a test is performed in step 410 to determine if a ransomware attack or another unauthorized encryption is detected. If it is determined in step 410 that a ransomware attack or another unauthorized encryption is not detected, then program control returns to step 410 to continue to monitor for such a ransomware attack or another unauthorized encryption.

If, however, it is determined in step 410 that a ransomware attack or another unauthorized encryption is detected, then the process 400 queries the operating system in step 420 for a size of the available space of a file system. The process 400 then creates one or more files in step 430 to fill the determined available space of the file system.

At least some embodiments described herein provide unauthorized encryption protection techniques and associated mitigation functionality that populates available storage in response to a detected unauthorized encryption to mitigate against further damage. Such embodiments can populate the available storage by creating one or more files that collectively fill or otherwise populate the amount of available storage. The phrase "creates one or more files," and variations thereof, as used in this context and elsewhere herein are intended to be broadly construed so as to encompass, for example, fully creating one or more files following a detected unauthorized encryption, as well as configuring one or more parameters of a file in advance of the detected unauthorized encryption, and then writing the created files after the detected unauthorized encryption, as would be apparent to a person of ordinary skill in the art based on the present disclosure.

In step 440, the created one or more files are written to the file system, such that further write operations encounter out-of-space errors (or another error).

Figure 5:
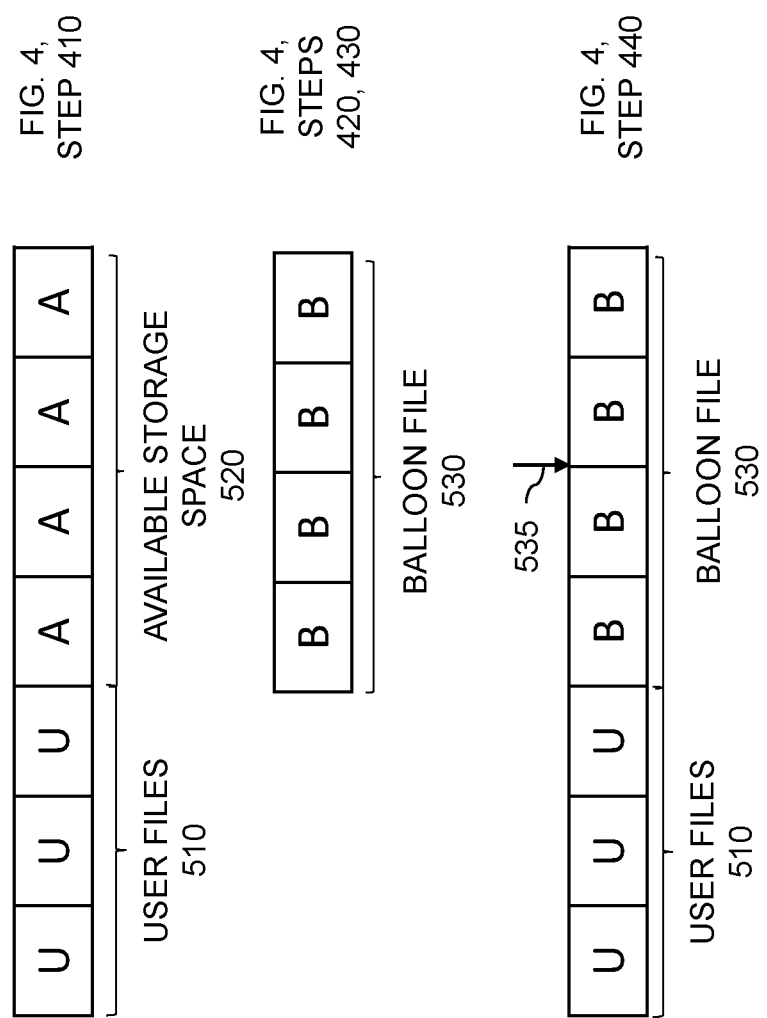
FIG. 5 illustrates a status of one or more user files and an available storage space with respect to a number of the steps in the flow chart of FIG. 4 in accordance with an illustrative embodiment.

FIG. 5 illustrates a status of one or more user files 510 and an available storage space 520 of one or more storage devices, with respect to a number of the steps in the flow chart of FIG. 4, in accordance with an illustrative embodiment. In the example of FIG. 5, the contents ("UUU") of the user files 510 are monitored in conjunction with the step 410 of FIG. 4. The remaining available portion (with empty contents indicated as "AAAA" in FIG. 5) of the one or more storage devices of the protected device is referred to as available storage space 520.

In response to the detection of a ransomware attack or another unauthorized encryption in step 410, the process 400 of FIG. 4 queries the operating system in step 420 for a size of the available space of the one or more storage devices. The process 400 then creates one or more balloon files 530 (with contents indicated as "BBBB" in FIG. 5) in steps 420, 430 of FIG. 4 to fill the available storage space 520 of the one or more storage devices.

The created one or more balloon files 530 are then written in step 440 of FIG. 4 to the one or more storage devices (as indicated by the arrow 535 in FIG. 5) that result in the one or more storage devices being populated (e.g., filled) with user files ("UUU") or the one or more balloon files 530 ("BBB"). Thus, further write operations to the one or more storage devices encounter out-of-space errors (or another error).

Figure 6:
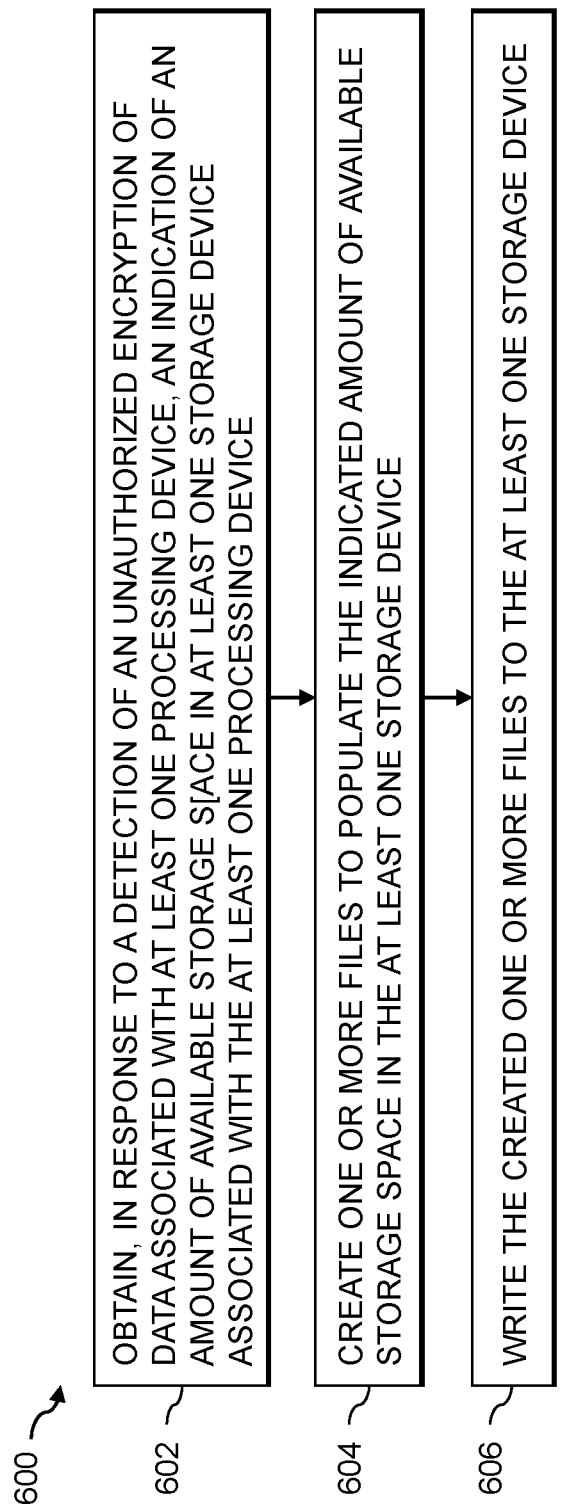
FIG. 6 is a flow chart illustrating an exemplary implementation of a process for device protection against unauthorized encryption using population of available storage in accordance with an illustrative embodiment.

FIG. 6 is a flow chart illustrating an exemplary implementation of a process 600 for device protection against unauthorized encryption using population of available storage in accordance with an illustrative embodiment. In the example of FIG. 6, the process 600 obtains, in step 602, in response to a detection of an unauthorized encryption of data associated with at least one processing device, an indication of an amount of available storage space in at least one storage device associated with the at least one processing device. In step 604, the process 600 creates one or more files to populate the indicated amount of available storage space in the at least one storage device. The created one or more files are written in step 606 to the at least one storage device.

In some embodiments, the obtaining the indication of the amount of available storage space comprises querying an operating system associated with the at least one processing device. An out-of-space error may be generated in response to a further write operation, following the writing of the created one or more files to the at least one storage device. The unauthorized encryption of data may comprise a ransomware attack.

In one or more embodiments, the indicated amount of available storage space in the at least one storage device comprises one or more of sequential and non-sequential storage areas of the at least one storage device. The indicated amount of available storage space in the at least one storage device may comprise an amount of available space in a file system associated with the at least one storage device. The file system of the at least one processing device may write the created one or more files to the at least one storage device by populating available storage areas of the at least one storage device.

The particular processing operations and other network functionality described in conjunction with FIGS. 4 through 6, for example, are presented by way of illustrative example only, and should not be construed as limiting the scope of the disclosure in any way. Alternative embodiments can use other types of processing operations for device protection against unauthorized encryption using population of available storage. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

The disclosed techniques for device protection against unauthorized encryption using population of available storage can be employed, for example, to monitor for unauthorized encryption and to mitigate such detected unauthorized encryption by automatically writing one or more files, such as balloon files, to the remaining available space of the storage devices associated with a protected device.

One or more embodiments of the disclosure provide improved methods, apparatus and computer program products for device protection against unauthorized encryption using population of available storage. The foregoing applications and associated embodiments should be considered as illustrative only, and numerous other embodiments can be configured using the techniques disclosed herein, in a wide variety of different applications.

It should also be understood that the disclosed unauthorized encryption protection techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for device protection against unauthorized encryption using population of available storage may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based unauthorized encryption protection engine, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of a cloud-based unauthorized encryption protection platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. These platforms may also be used to implement at least portions of other information processing systems in other embodiments.

Figure 7:
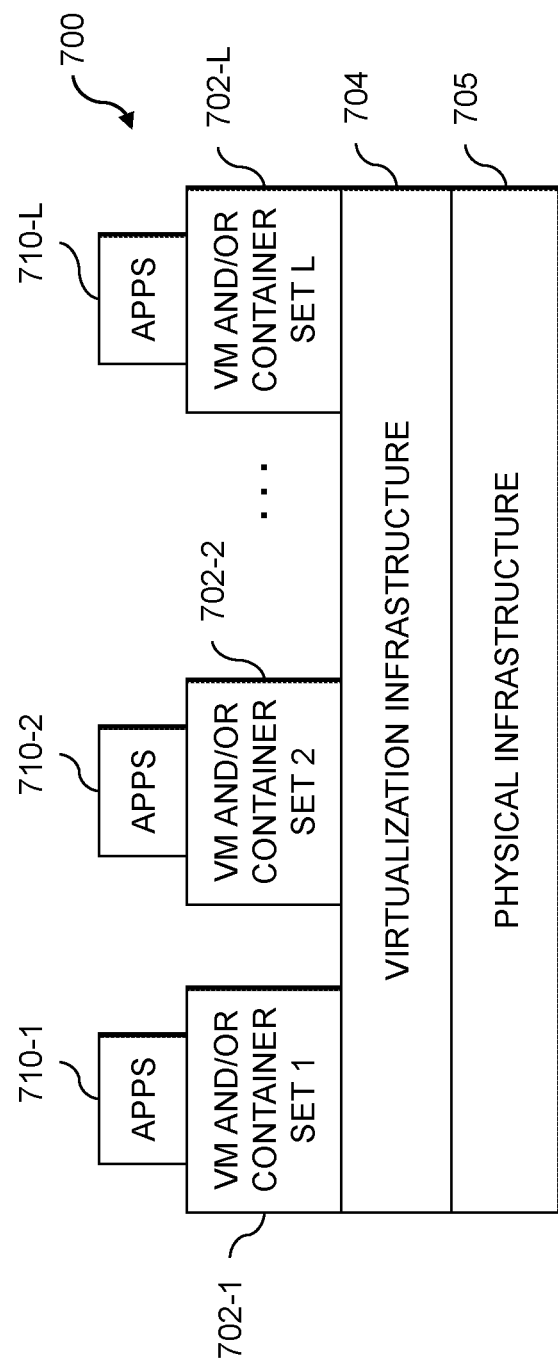
FIG. 7 illustrates an exemplary processing platform that may be used to implement at least a portion of one or more embodiments of the disclosure comprising a cloud infrastructure.

FIG. 7 shows an example processing platform comprising cloud infrastructure 700. The cloud infrastructure 700 comprises a combination of physical and virtual processing resources that may be utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. Such implementations can provide unauthorized encryption detection functionality of the type described above for one or more processes running on a given one of the VMs. For example, each of the VMs can implement unauthorized encryption protection control logic and associated mitigation functionality for one or more processes running on that particular VM.

An example of a hypervisor platform that may be used to implement a hypervisor within the virtualization infrastructure 704 is the VMware® vSphere® which may have an associated virtual infrastructure management system such as the VMware® vCenter™. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system. Such implementations can provide unauthorized encryption detection and mitigation functionality of the type described above for one or more processes running on different ones of the containers. For example, a container host device supporting multiple containers of one or more container sets can implement one or more instances of unauthorized encryption protection control logic and associated mitigation functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises at least a portion of the given system and includes a plurality of processing devices, denoted 802-1, 802-2, 802-3, . . . 802-K, which communicate with one another over a network 804. The network 804 may comprise any type of network, such as a WAN, a LAN, a satellite network, a telephone or cable network, a cellular network, a wireless network such as WiFi or WiMAX, or various portions or combinations of these and other types of networks.

The processing device 802-1 in the processing platform 800 comprises a processor 810 coupled to a memory 812. The processor 810 may comprise a microprocessor, a microcontroller, an ASIC, an FPGA or other type of processing circuitry, as well as portions or combinations of such circuitry elements, and the memory 812, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and the given system may include additional or alternative processing platforms, as well as numerous distinct processing platforms in any combination, with each such platform comprising one or more computers, storage devices or other processing devices.

Figure 8:
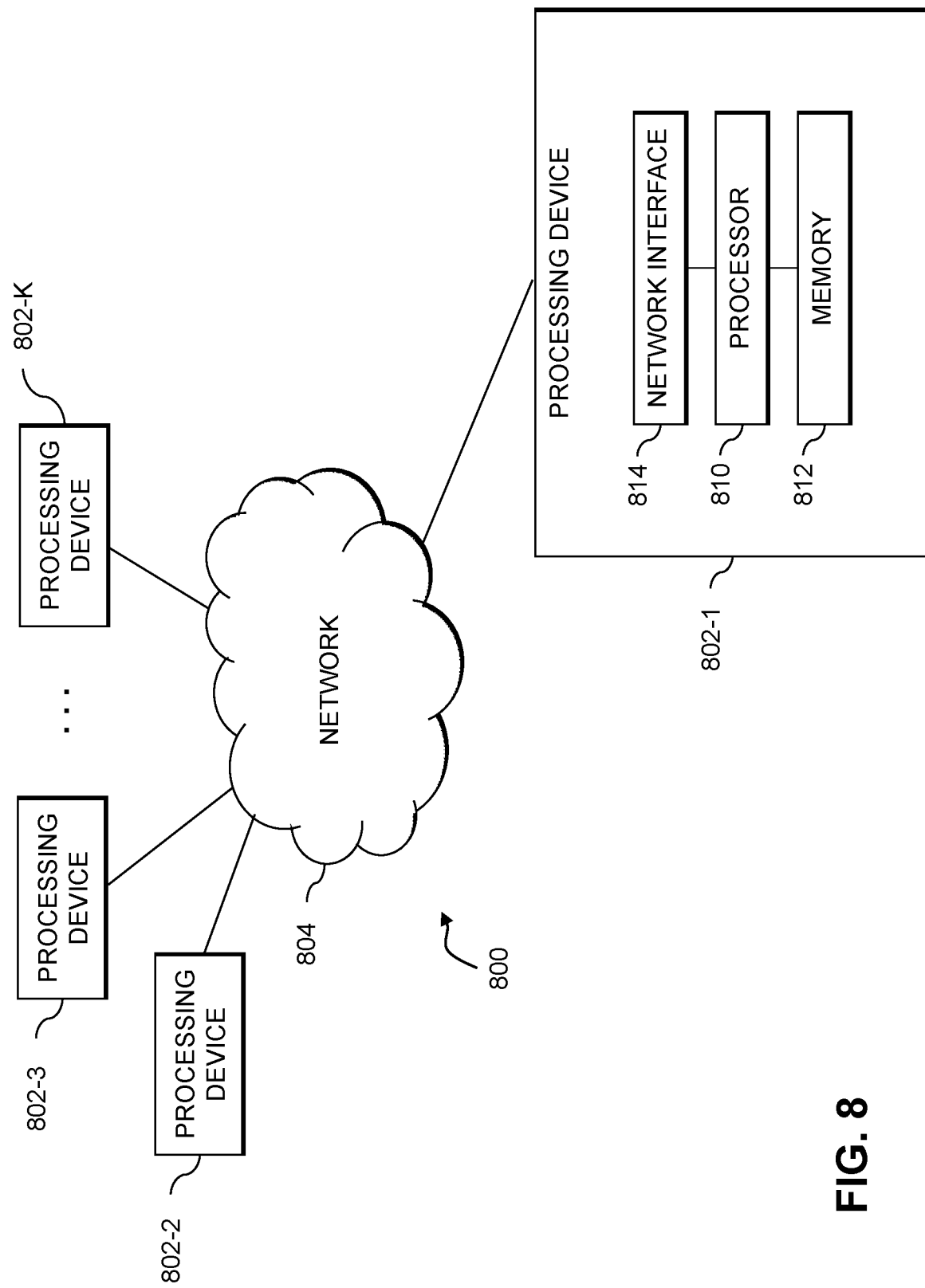
FIG. 8 illustrates another exemplary processing platform that may be used to implement at least a portion of one or more embodiments of the disclosure.

Multiple elements of an information processing system may be collectively implemented on a common processing platform of the type shown in FIG. 7 or 8, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
obtaining, in response to a detection of an unauthorized encryption of data associated with at least one processing device, an indication of an amount of available storage space in at least one storage device associated with the at least one processing device;
creating one or more files to populate the indicated amount of available storage space in the at least one storage device; and
writing the created one or more files to the at least one storage device;
wherein the method is performed by the at least one processing device, wherein the at least one processing device comprises a processor coupled to a memory.

2. The method of claim 1, wherein the obtaining the indication of the amount of available storage space comprises querying an operating system associated with the at least one processing device.

3. The method of claim 1, further comprising, following the writing of the created one or more files to the at least one storage device, generating an out-of-space error in response to a further write operation.

4. The method of claim 1, wherein the unauthorized encryption of data is associated with a ransomware attack.

5. The method of claim 1, wherein the indicated amount of available storage space in the at least one storage device comprises one or more of sequential and non-sequential storage areas of the at least one storage device.

6. The method of claim 1, wherein the indicated amount of available storage space in the at least one storage device comprises an amount of available space in a file system associated with the at least one storage device.

7. The method of claim 1, wherein a file system of the at least one processing device writes the created one or more files to the at least one storage device by populating available storage areas of the at least one storage device.

8. An apparatus comprising:
at least one processing device comprising a processor coupled to a memory;
the at least one processing device being configured to implement the following steps:
obtaining, in response to a detection of an unauthorized encryption of data associated with the at least one processing device, an indication of an amount of available storage space in at least one storage device associated with the at least one processing device;
creating one or more files to populate the indicated amount of available storage space in the at least one storage device; and
writing the created one or more files to the at least one storage device.

9. The apparatus of claim 8, wherein the obtaining the indication of the amount of available storage space comprises querying an operating system associated with the at least one processing device.

10. The apparatus of claim 8, further comprising, following the writing of the created one or more files to the at least one storage device, generating an out-of-space error in response to a further write operation.

11. The apparatus of claim 8, wherein the unauthorized encryption of data is associated with a ransomware attack.

12. The apparatus of claim 8, wherein the indicated amount of available storage space in the at least one storage device comprises one or more of sequential and non-sequential storage areas of the at least one storage device.

13. The apparatus of claim 8, wherein the indicated amount of available storage space in the at least one storage device comprises an amount of available space in a file system associated with the at least one storage device.

14. The apparatus of claim 8, wherein a file system of the at least one processing device writes the created one or more files to the at least one storage device by populating available storage areas of the at least one storage device.

15. A non-transitory processor-readable storage medium having stored therein program code of one or more software programs, wherein the program code when executed by at least one processing device causes the at least one processing device to perform the following steps:
obtaining, in response to a detection of an unauthorized encryption of data associated with the at least one processing device, an indication of an amount of available storage space in at least one storage device associated with the at least one processing device;
creating one or more files to populate the indicated amount of available storage space in the at least one storage device; and
writing the created one or more files to the at least one storage device.

16. The non-transitory processor-readable storage medium of claim 15, wherein the obtaining the indication of the amount of available storage space comprises querying an operating system associated with the at least one processing device.

17. The non-transitory processor-readable storage medium of claim 15, further comprising, following the writing of the created one or more files to the at least one storage device, generating an out-of-space error in response to a further write operation.

18. The non-transitory processor-readable storage medium of claim 15, wherein the indicated amount of available storage space in the at least one storage device comprises one or more of sequential and non-sequential storage areas of the at least one storage device.

19. The non-transitory processor-readable storage medium of claim 15, wherein the indicated amount of available storage space in the at least one storage device comprises an amount of available space in a file system associated with the at least one storage device.

20. The non-transitory processor-readable storage medium of claim 15, wherein a file system of the at least one processing device writes the created one or more files to the at least one storage device by populating available storage areas of the at least one storage device.

\* \* \* \* \*